United States Patent
Holowczak et al.

(10) Patent No.: US 10,227,888 B2
(45) Date of Patent: Mar. 12, 2019

(54) VARIABLE VANE SYSTEMS

(71) Applicant: UNITED TECHNOLOGIES CORPORATION, Farmington, CT (US)

(72) Inventors: John E. Holowczak, S. Windsor, CT (US); Brian M. Holley, Eastford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 398 days.

(21) Appl. No.: 14/623,412

(22) Filed: Feb. 16, 2015

(65) Prior Publication Data

US 2016/0237844 A1  Aug. 18, 2016

(51) Int. Cl.
| | | |
|---|---|---|
| *F01D 17/16* | (2006.01) | |
| *F01D 11/04* | (2006.01) | |
| *F04D 29/057* | (2006.01) | |
| *F04D 29/56* | (2006.01) | |
| *F04D 29/58* | (2006.01) | |

(52) U.S. Cl.
CPC ............ *F01D 17/162* (2013.01); *F01D 11/04* (2013.01); *F04D 29/057* (2013.01); *F04D 29/563* (2013.01); *F04D 29/584* (2013.01); *Y02T 50/671* (2013.01)

(58) Field of Classification Search
CPC ........ F01D 17/162; F01D 11/04; F01D 25/22; F01D 17/167; F04D 29/057; F04D 29/563; F04D 29/584; F04D 29/04; F04D 29/0413; Y02T 50/671
USPC ......... 384/100, 109, 317; 415/115, 48, 53.3, 415/162, 209.3, 209.4, 116, 180
See application file for complete search history.

(56) References Cited

U.S. PATENT DOCUMENTS

| | | | | |
|---|---|---|---|---|
| 5,517,817 A | * | 5/1996 | Hines .................... | F01D 17/162 415/115 |
| 6,792,762 B1 | * | 9/2004 | Yamanaka .............. | F02C 7/185 415/115 |
| 8,753,014 B2 | * | 6/2014 | Devitt ................. | F16C 32/0618 277/358 |

* cited by examiner

*Primary Examiner* — Jason D Shanske
*Assistant Examiner* — Brian Christopher Delrue
(74) *Attorney, Agent, or Firm* — Cantor Colburn LLP

(57) ABSTRACT

A variable vane system includes an outer platform, an inner casing radially inward from the outer casing and a vane extending between the inner and outer casings defining a vane axis. An inner vane stem is engaged with the inner casing and an outer vane stem is engaged with the outer casing. The system includes a bearing gap defined radially with respect to the vane axis between each of the inner and outer casings and respective vane stems for allowing the vane to rotate about the vane axis for varying angle of attack. The system includes a pressurized air supply inlet in fluid communication with at least one of the bearing gaps to form a stem air bearing to intermittently float at least one of the vane stems for controlled rotation about the vane axis.

20 Claims, 4 Drawing Sheets

VARIABLE VANE SYSTEMS

BACKGROUND OF THE INVENTION

1. Field of the Invention

The present disclosure relates to vanes, and more particularly to variable vanes such as in variable vane systems.

2. Description of Related Art

Traditionally, a gas turbine engine for an aircraft includes multiple stages of variable vanes to condition and guide airflow through the compressor and/or turbine sections. Variable vanes are configured to be pivoted about their vane axes in order to optimize airflow characteristics for various operating conditions.

Variable vanes can be connected to a synchronization ring (sync ring), each by a respective vane arm connected to the stem of the vane. The sync ring can drive each vane counter-clockwise and/or clockwise around its respective longitudinal axis in order to set the optimal vane stage angle for a particular operating condition. Each vane stem is operatively connected to a respective casing. Between each vane stem and its respective casing is a bearing and/or a bushing. High engine temperatures and pressures can present challenges for bearings and bushings. It is expected that this will be exacerbated due to the ongoing trend of designing gas turbine engines to operate at even higher temperatures and pressures. Such conventional methods and systems have generally been considered satisfactory for their intended purpose. However, there is still a need in the art for improved variable vane systems.

SUMMARY OF THE INVENTION

A variable vane system includes an outer casing defining a centerline axis, an inner casing radially inward from the outer casing with respect to the centerline axis and a vane extending between the inner and outer casings defining a vane axis. The vane has an inner vane stem and an opposed outer vane stem. The inner vane stem is engaged with the inner casing and the outer vane stem is engaged with the outer casing. The system includes a bearing gap defined radially with respect to the vane axis between each of the inner and outer casings and respective vane stems for allowing the vane to rotate about the vane axis for varying angle of attack. The system includes a pressurized air supply inlet in fluid communication with at least one of the bearing gaps to form a stem air bearing to intermittently float at least one of the vane stems for controlled rotation about the vane axis.

In accordance with certain embodiments, an internal cavity of the vane is in fluid communication with the pressurized air supply inlet. The bearing gap can be a stem bearing gap. The internal cavity of the vane can be in fluid communication with at least one of the bearing gaps to supply pressurized air thereto. At least one of the vane stems can include an aperture in fluid communication between the internal cavity of the vane and one of the bearing gaps to supply pressurized air from the internal cavity of the vane to the bearing gap. The vane can include a casing portion radially outward with respect to the centerline axis from the outer casing. A casing bearing gap can be defined radially with respect to the centerline axis between the casing portion and the outer casing.

The internal cavity of the vane can be in fluid communication with the casing bearing gap to supply pressurized air thereto to form a casing air bearing to intermittently float at least one of the vane stems for controlled rotation of the vane about the vane axis. The casing portion can include an aperture in fluid communication between the internal cavity of the vane and the casing bearing gap to supply pressurized air to the casing bearing gap. The system can include a seal between a radially inward surface of the casing portion of the vane and a radially outward surface of the outer casing.

In accordance with another aspect, at least one of the inner casing or the outer casing can include a casing cavity in fluid communication with the pressurized air supply inlet. The casing cavity can be in fluid communication with at least one of the bearing gaps to supply pressurized air thereto. The casing cavity can include an aperture in fluid communication between the casing cavity and at least one of the bearing gaps to supply pressurized air from the casing cavity to the bearing gap. The casing cavity can be in fluid communication with the casing bearing gap to supply pressurized air thereto to form a casing air bearing to intermittently float at least one of the vane stems for controlled rotation of the vane about the vane axis. The casing cavity can include a radially outward facing aperture to supply pressurized air to the casing bearing gap.

A gas turbine engine includes a pressurized air source and a variable vane system in fluid communication with the pressurized air source. The pressurized air supply inlet of the variable vane system is in fluid communication with the pressurized air source and at least one of the bearing gaps to provide pressurized air to the bearing gap to form a stem air bearing to intermittently float at least one of the vane stems for controlled rotation of the vane about the vane axis.

It is contemplated that the gas turbine engine can include a heat exchanger fluidly connected between the pressurized air source and the variable vane system to change the temperature of the air from the pressurized air source before entering the variable vane system. The gas turbine engine can include a booster pump in fluid communication between the pressurized air source and the variable vane system to increase air pressure in the pressurized air supply inlet. The gas turbine engine can include a valve in fluid communication between the pressurized air source and the variable vane system to control airflow from the pressurized air source to the variable vane system. The pressurized air source can be at least one of diverted turbine cooling air, a compressor air bleed, a pressurized air tank, or outside ambient air.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
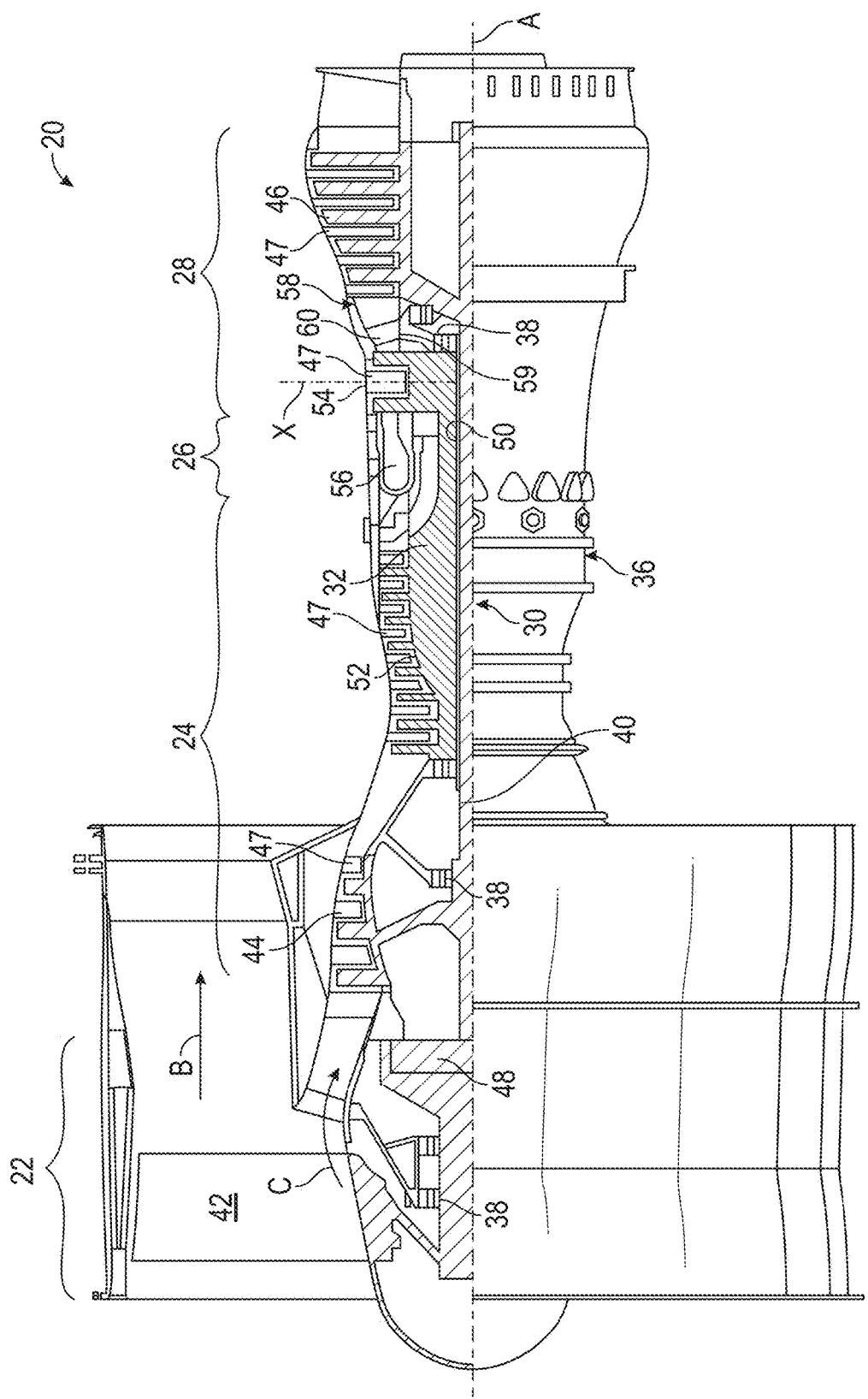
FIG. 1 is a schematic cross-sectional side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a cross-sectional view of an exemplary embodiment of a gas turbine engine constructed in accordance with the disclosure is shown in FIG. 1 and is designated generally by reference character 100. Other embodiments of gas turbine engines constructed in accordance with the disclosure, or aspects thereof, are provided in FIGS. 2-4, as will be described.

As shown in FIG. 1, a gas turbine engine 20 is schematically shown. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, low-bypass two-spool architectures, turbojet engines, and the like.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. Mid-turbine frame 58 includes an inner case 59 and supports bearing systems 38 in the turbine section 28. The inner shaft 40 and the outer shaft 50 are concentric and rotate via bearing systems 38 about the engine central longitudinal axis A which is collinear with their longitudinal axes. While described herein as a geared fan, embodiments of the present disclosure can be used in non-geared fan engines as well.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 58 includes airfoils 60 which are in the core airflow path C. It is also possible that the airfoils 60 can be variable vanes, similar to vanes 106 of variable vane stage 47, shown in FIG. 2 and described in more detail below. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
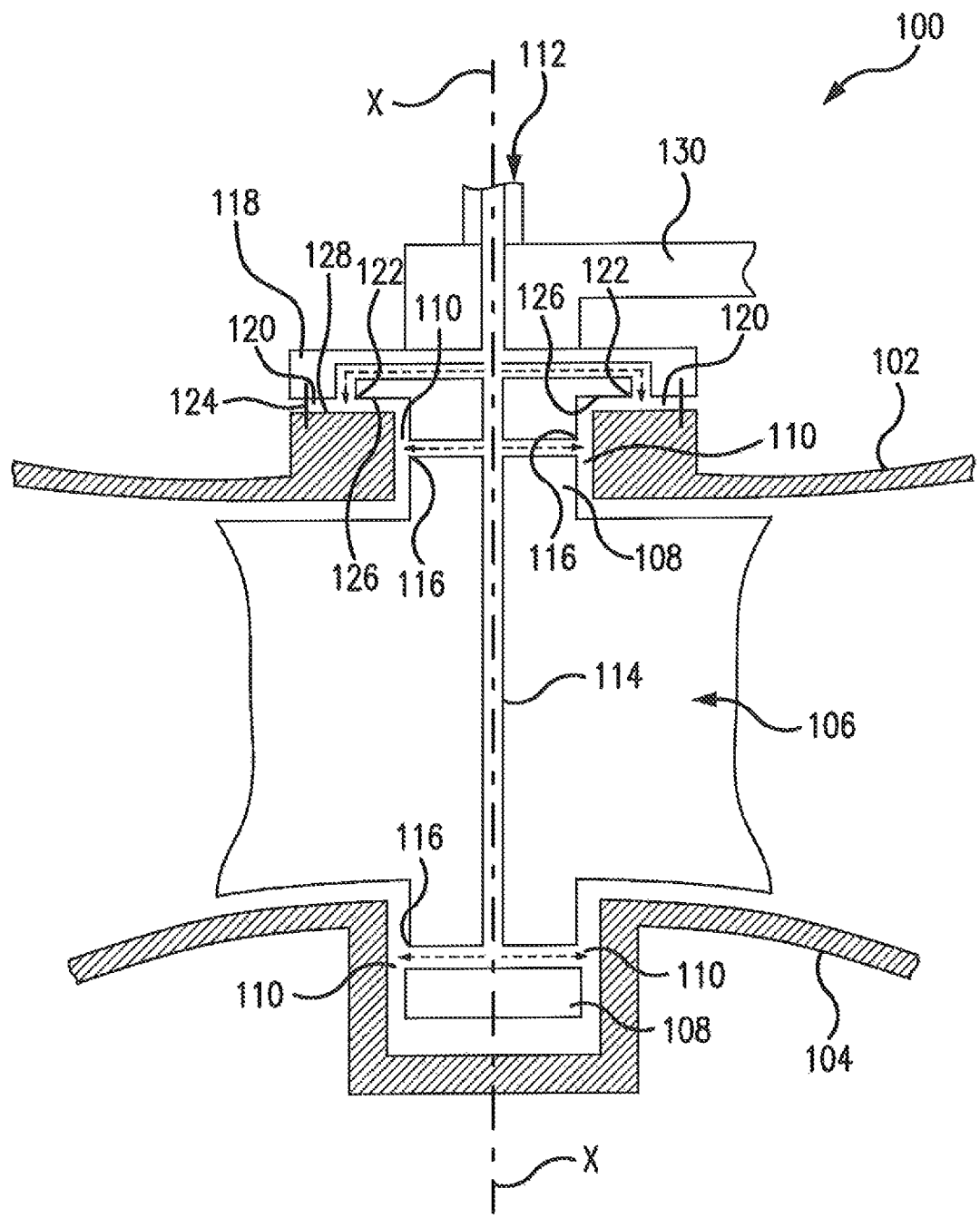
FIG. 2 is a schematic cross-sectional side elevation view of a portion of the gas turbine engine shown in FIG. 1, showing an embodiment of the variable vane system.

Now with reference to FIGS. 1 and 2, gas turbine engine 20 includes a variable vane system 100 in any one of various vane stages 47, for example in vane stage 47 in the high pressure turbine (HPT) 54, or in the airfoils 60 of mid-turbine frame 58. Variable vane system 100 includes an outer casing 102, an inner casing 104 radially inward from outer casing 102 and a vane 106 extending between inner and outer casings 104 and 102, respectively, defining a vane axis X substantially radial to centerline axis A. While shown as single inner and outer casings, 104 and 102, respectively, having a single vane 106 disposed therebetween, it is contemplated that inner and outer casings, 104 and 102, respectively, can be circumferentially joined to other inner and outer casings to form a full annular hoop having a series of inner casings and outer casings with respective vanes therebetween.

Vane 106 has opposed inner and outer vane stems 108 both engaged with respective inner and outer casings 104 and 102, respectively, operatively connecting inner and outer casings 104 and 102, respectively, to respective ends of vane 106. System 100 includes bearing gaps 110, e.g. stem bearing gaps, defined radially with respect to vane axis X between the inner and outer casings, 104 and 102, respectively, and respective vane stems 108 for allowing vane 106 to rotate about vane axis X for varying angle of attack with respect to core airflow path C, shown in FIG. 1. System 100 includes a pressurized air supply inlet 112 in fluid communication with stem bearing gaps 110 forming stem air bearings to intermittently float vane stems 108 for controlled rotation about vane axis X. An internal cavity 114 of vane 106 is in fluid communication with pressurized air supply inlet 112. Internal cavity 114 of vane 106 is in fluid communication with stem bearing gaps 110 to supply pressurized air thereto. Vane stems 108 include apertures 116 in fluid communication between internal cavity 114 of vane 106 and stem bearing gap 110 to supply pressurized air from internal cavity 114 of vane 106 to stem bearing gap 110. Variable vane system 100 is able to change the angle of attack and throat area of vane 106, for example, a first stage high pressure turbine (HPT) vane, while still maintaining high-temperature resistance and providing low-friction for ease of articulation. Those skilled in the art will readily appreciate that while vane system 100 is shown without bushings, bushings can be used in conjunction with vane system 100, for example circumferentially disposed around each vane stem 108. It is also contemplated that rolling element bearings can be used in conjunction with the bearing gaps described above. Rotation of vane 106 in variable vane system 100 is driven by actuation arm 130. Actuation arm 130 is part of an actuation mechanism.

With continued reference to FIG. 2, vane 106 includes a casing portion 118 radially outward from outer casing 102. A casing bearing gap 120 is defined radially between casing portion 118 and outer casing 102. Internal cavity 114 of vane 106 is in fluid communication with casing bearing gap 120 to supply pressurized air thereto to form a casing air bearing to intermittently float vane stems 108, as described above. Casing portion 118 includes an aperture 122 in fluid communication between internal cavity 114 of vane 106 and casing bearing gap 120 to supply pressurized air thereto. The system includes a seal 124 between a radially inward face 126 of casing portion 118 of vane 106 and a radially outward surface 128 of outer casing 102. Those skilled in the art will readily appreciate that while only one vane 106 is shown, a vane stage can include a plurality of vanes, variable or not, circumferentially disposed about engine centerline axis A.

Figure 3:
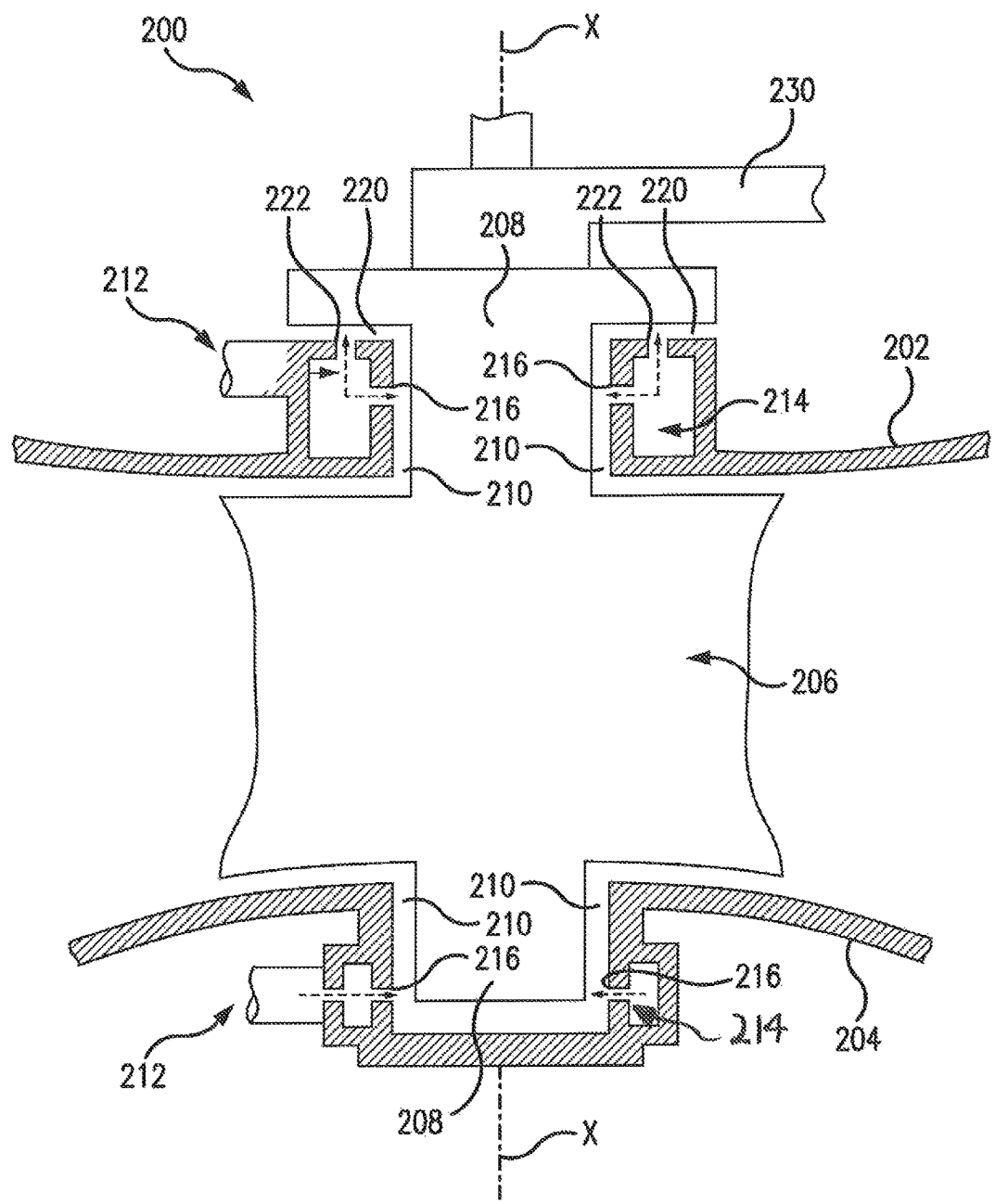
FIG. 3 is a schematic cross-sectional side elevation view of another embodiment of a variable vane system constructed in accordance with the present disclosure.

With reference now to FIG. 3, another exemplary embodiment of a variable vane system 200 is shown. Variable vane system 200 is similar to variable vane system 100. Variable vane system 200 includes an outer casing 202 and an inner casing 204 radially inward from outer casing 202 with respect to centerline axis A. System 200 includes a vane 206 extending between inner and outer casings 204 and 202, respectively, defining a vane axis X. Vane 206 has opposed inner and outer vane stems 208 and stem bearing gaps 210 defined radially with respect to vane axis X between inner and outer casings, 204 and 202, respectively. System 200 includes an actuation arm 230 for driving rotation of vane 206.

With continued reference to FIG. 3, system 200 includes a pressurized air supply inlet 212 in fluid communication with stem bearing gaps 210 to form a stem air bearing to intermittently float vane stems 208. In variable vane system 200, instead of a vane cavity, e.g. vane cavity 114, inner casing 204 and outer casing 202 each include a casing cavity 214 in fluid communication with a respective pressurized air supply inlet 212. Casing cavities 214 are in fluid communication with respective stem bearing gaps 210 to supply pressurized air thereto. Each casing cavity 214 includes an aperture 216 in fluid communication between casing cavity 214 and stem bearing gap 210 to supply pressurized air from casing cavity 214 to stem bearing gap 210. Casing cavity 214 in outer casing 202 is in fluid communication with a casing bearing gap 220, similar to casing bearing gap 120, to supply pressurized air thereto. Casing cavity 214 of outer casing 202 includes a radially outward facing aperture 222 to supply pressurized air to casing bearing gap 220.

During operation, a signal is sent indicating a need to change vane angle of attack of a vane, e.g. vane 106 and/or 206. Upon receiving the signal, pressurized air is directed to vane stems, e.g. a vane stem 108 and/or 208, of the vane. The release of pressurized air through apertures, e.g. apertures 116, 122, 216 and/or 222, to bearing gaps 110, 120, 210 and/or 220, provides a brief cushion of air within bearing gaps creating a momentary hydrostatic (air) bearing to lift vane stems, e.g. vane stems 108 and/or 208, off their respective resting points. Once lifted, the vane stems and the vane pivot under minimal load to the actuation mechanism, a portion of which is shown in FIGS. 2 and 3 as an actuation arm 130 and/or 230. Air bearings provide very low friction by supporting the sliding surface, in this case the vane stems, on an air cushion. After the vane is located in its new position, pressure is removed and the vane is held into position. The low friction in air bearings allow the actuation mechanism and related components to be compact and light weight.

While variable vane systems 100 and 200 are described herein as having pressurized air supplied to bearing gaps 110, 120, 210 and/or 220 only when vane rotation is desired, it is also contemplated that pressurized air could also be provided to clear vane stems surfaces, e.g. surfaces of vane stems 108 and/or 208, and any bushing surfaces of foreign material, to provide cooling, and/or overcome any bonding that may have occurred during the period when the vane was in a stationary position. To the same end, the pressurized air can be provided intermittently for the purpose of maintaining reduced friction even when the vane is not being actuated.

Figure 4:
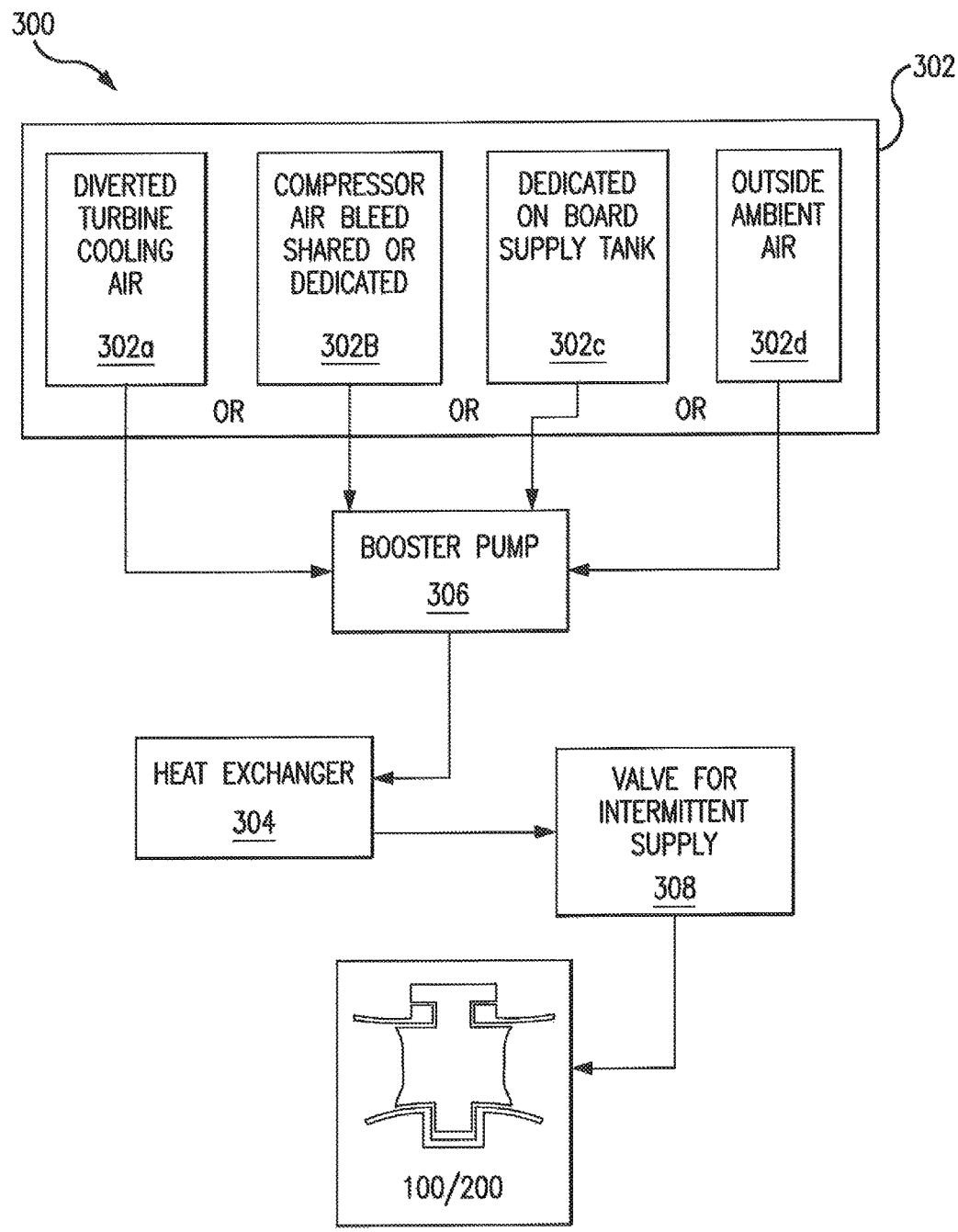
FIG. 4 is a schematic depiction of an air bearing system constructed in accordance with another exemplary embodiment of the invention, showing the pressurized air source and the variable vane system.

As shown in FIG. 4, an air bearing system 300 for variable vanes, e.g. vanes 106 or 206, includes a pressurized air source 302 and a variable vane system, e.g. variable vane systems 100 or 200, in fluid communication with pressurized air source 302. Pressurized air supply inlets, e.g. inlets 112 and/or 212, of variable vane systems 100 and 200, respectively, are in fluid communication with pressurized air source 300 and the stem bearing gaps, e.g. gaps 110 and 210, to provide pressurized air thereto to intermittently float vane stems, e.g. vane stems 108 and/or 208, for controlled rotation of a vane, e.g. vane 106 or 206, about vane axis X.

With continued reference to FIG. 4, air bearing system 300 includes a heat exchanger 304 fluidly connected between pressurized air source 300 and variable vane system 100 and/or 200 to heat or cool air as needed from pressurized air source 300 before entering the variable vane system 100 and/or 200. This tends to reduce thermal shock to vanes 106 and/or 206. It is contemplated that heat exchanger 304 is optional and may not be needed in a given configuration. Air bearing system 300 includes a booster pump 306 in fluid communication with pressurized air source 300 and variable vane system 100 and/or 200 to increase air pressure in pressurized air supply inlet 112 and/or 212. Those skilled in the art will readily appreciate that booster pump 306 is optional depending on the desired pressure and the pressure source. Air bearing system 300 includes a valve 308 in fluid communication between pressurized air source 300 and variable vane system 100 and/or 200 to control airflow from pressurized air source 300 to variable vane system 100/200. It is contemplated that pressurized air source 300 can be diverted turbine cooling air 302a, a compressor air bleed 302b, a pressurized air tank 302c, and/or outside ambient air 302d.

Those skilled in the art will readily appreciate that the intermittency of the use of the pressurized air, described above, reduces the load on pressurized air source 300. It is also contemplated that pressurized air source 300 can be used to drive the actuation mechanism, discussed above, serving a dual purpose and further maximizing weight savings. Variable vane system 200, and variable vane system 100 can be used in the same vane or in the same vane stage. For example, vane cavity 114 and casing cavity 214 can be used in combination with one another within a single vane, and/or vanes having vane cavity 114, casing cavity 214, or both, can be used in combination throughout a vane stage.

The methods and systems of the present disclosure, as described above and shown in the drawings, provide for variable vane systems with superior properties including improved temperature resistance and reduced weight. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A variable vane system, comprising:
an outer casing;
an inner casing radially inward from the outer casing;
a vane extending between the inner and outer casings defining a vane axis along which an internal cavity extends, the vane having an inner vane stem extending into the inner casing, the inner vane stem defining a first vane stem aperture that extends through the inner vane stem, the first vane stem aperture being disposed transverse to the internal cavity, and an opposed outer vane stem extending into the outer casing, the outer vane stem defining a second vane stem aperture that extends through the outer vane stem, wherein the inner vane stem is engaged with the inner casing and the outer vane stem is engaged with the outer casing;
a bearing gap defined radially between each of the inner and outer casings and respective vane stems for allowing the vane to rotate about the vane axis; and
a pressurized air supply inlet in fluid communication with at least one of the bearing gaps to form a stem air bearing to float at least one of the vane stems for controlled rotation of the vane about the vane axis.

2. The system as recited in claim 1, wherein the internal cavity of the vane is in fluid communication with the pressurized air supply inlet.

3. The system as recited in claim 2, wherein the internal cavity of the vane is in fluid communication with at least one of the bearing gaps to supply pressurized air thereto.

4. The system as recited in claim 2, wherein the first vane stem aperture and the second vane stem aperture are in fluid communication between the internal cavity of the vane and one of the bearing gaps to supply pressurized air from the internal cavity of the vane to the bearing gap.

5. The system as recited in claim 2, wherein the vane includes a casing portion radially outward from the outer casing, wherein a casing bearing gap is defined radially between the casing portion and the outer casing.

6. The system as recited in claim 5, wherein the internal cavity of the vane is in fluid communication with the casing bearing gap to supply pressurized air thereto to form a casing air bearing to float at least one of the vane stems for controlled rotation of the vane about the vane axis.

7. The system as recited in claim 5, wherein the casing portion includes an aperture in fluid communication between the internal cavity of the vane and the casing bearing gap to supply pressurized air to the casing bearing gap.

8. The system as recited in claim 5, further comprising a seal between a radially inward surface of the casing portion of the vane and a radially outward surface of the outer casing.

9. The system as recited in claim 1, wherein at least one of the inner casing or the outer casing includes a casing cavity in fluid communication with the pressurized air supply inlet.

10. The system as recited in claim 9, wherein the casing cavity is in fluid communication with at least one of the bearing gaps to supply pressurized air thereto.

11. The system as recited in claim 9, wherein the casing cavity includes an aperture in fluid communication between the casing cavity and at least one of the bearing gaps to supply pressurized air from the casing cavity to the bearing gap.

12. The system as recited in claim 9, wherein the vane includes a casing portion radially outward axis from the outer casing, wherein a casing bearing gap is defined radially between the casing portion and the outer casing.

13. The system as recited in claim 12, wherein the casing cavity is in fluid communication with the casing bearing gap to supply pressurized air thereto to form a casing air bearing to float at least one of the vane stems for controlled rotation of the vane about the vane axis.

14. The system as recited in claim 12, wherein the casing cavity includes a radially outward facing aperture to supply pressurized air to the casing bearing gap.

15. The system as recited in claim 12, further comprising a seal between a radially inward surface of the casing portion of the vane and a radially outward surface of the outer casing.

16. A gas turbine engine comprising:
a pressurized air source;
a variable vane system in fluid communication with the pressurized air source, wherein the variable vane system includes:
an outer casing;
a casing portion radially outward from the outer casing;
an inner casing radially inward from the outer casing;
a vane extending between the inner and outer casings defining a vane axis, the vane having an inner vane stem and an opposed outer vane stem, wherein the inner vane stem defines a first vane stem aperture that extends through the inner vane stem and is disposed transverse to the internal cavity, the inner vane stem extends into and is spaced apart from the inner casing by a bearing gap defined radially between the inner casing and the inner vane stem and the outer vane stem extends into and is spaced apart from the outer casing by another bearing gap defined radially between the outer casing and the outer vane stem, the outer casing and the casing portion defining an aperture therebetween that is disposed transverse to the internal cavity; and a pressurized air supply inlet in fluid communication with the pressurized air source and at least one of the bearing gaps to provide pressurized air to at least one of the bearing gaps to form a stem air bearing to float at least one of the vane stems for controlled rotation of the vane about the vane axis.

17. The gas turbine engine as recited in claim 16, further comprising a heat exchanger fluidly connected between the pressurized air source and the variable vane system to cool air from the pressurized air source before entering the variable vane system.

18. The gas turbine engine as recited in claim 16, further comprising a booster pump in fluid communication with the pressurized air source and the variable vane system to increase air pressure in the pressurized air supply inlet.

19. The gas turbine engine as recited in claim 16, further comprising a valve in fluid communication between the pressurized air source and the variable vane system to control airflow from the pressurized air source to the variable vane system.

20. The gas turbine engine as recited in claim 16, wherein the pressurized air source is at least one of diverted turbine cooling air, a compressor air bleed, a pressurized air tank, or outside ambient air.

* * * * *